UNITED STATES PATENT OFFICE 2,456,187

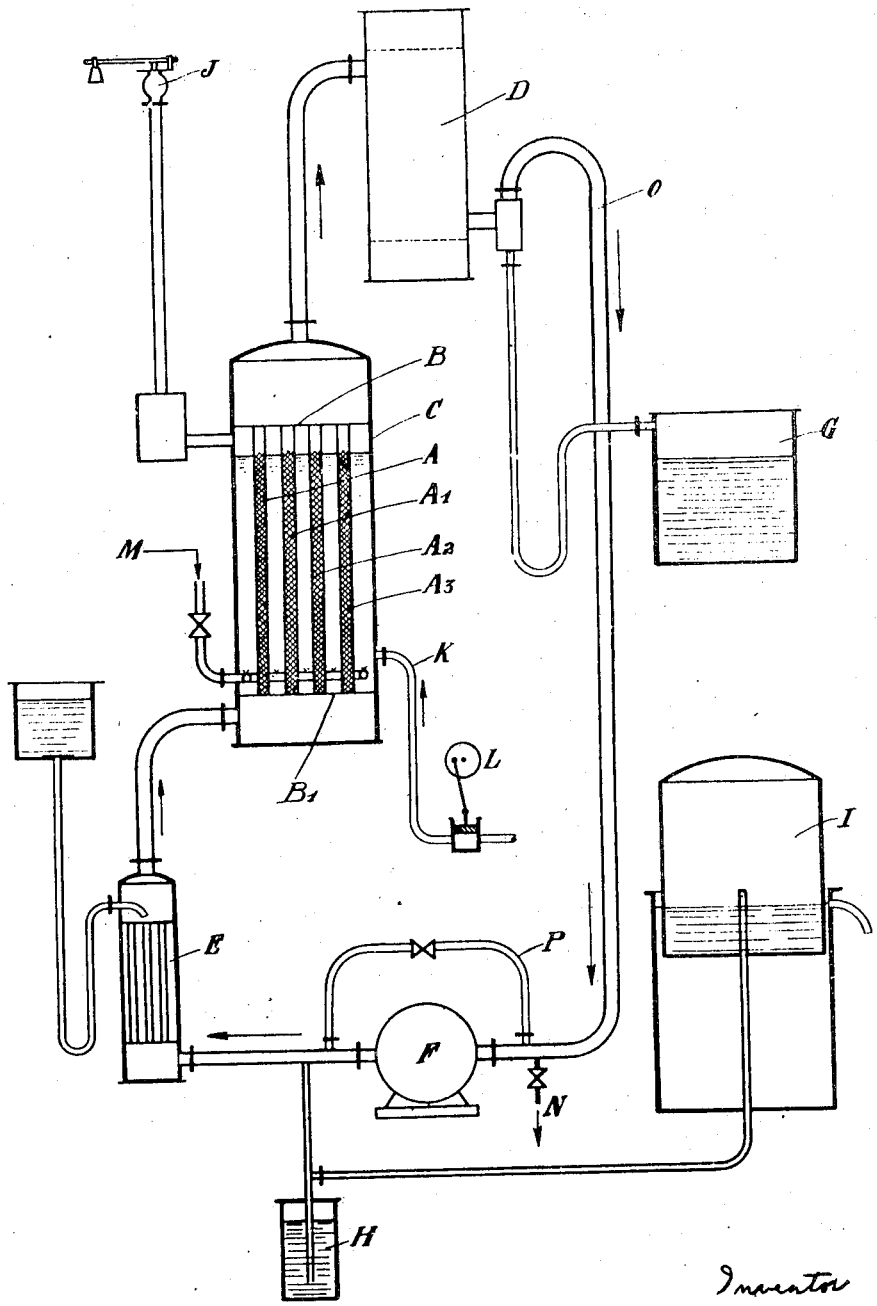

PROCESS FOR CATALYTICALLY HYDROGENATING ORGANIC SUBSTANCES

Henri Martin Guinot, Versailles, France, assignor to Les Usines De Melle (Societe Anonyme), Saint-Léger-les-Melle, France, a company of France Application June 15, 1945, Serial No. 599,607 In France September 5, 1941

Section 1, Public Law 690, August 8, 1946 Patent expires September 5, 1961

2 Claims. (Cl. 260—690)

Since the celebrated works of Sabatier in respect of hydrogenation of organic substances in gaseous phase in the presence of reduced metals acting as catalysts, various industrial applications of his methods have been made. As a matter of fact, it is almost exclusively nickel catalysts which have been used in actual practice by reason of their general qualities, although the high temperature to which the catalysis oven should be raised to secure reduction of oxide is a serious hinderance to the development of like processes.

As to copper, the oxide of which is readily reduced, its employment has sometimes been proposed (for instance in French Patent No. 639,756 filed January 31, 1927) but remains an exception, the said catalyst being considered rather as one suitable to promote dehydrogenation particularly of alcohols while its potency in respect of promoting hydrogenations is generally regarded as of second-rate.

In contradistinction with prevailing opinion, I have now found that copper catalysts are capable of promoting a larger number of hydrogenations with an activity equivalent to that of the best nickel catalysts, provided said copper catalysts are suitably prepared.

It is known that in conventional reduction of precipitated copper oxide laid in a tube through which a stream of hydrogen is passed, heat evolution can be so large that the mass is sometimes raised to red heat at successive places, and portions of molten copper may be found locally thus showing a temperature elevation above 1,100° C.

I have ascertained that any precautions taken to avoid such phenomena, particularly the use of a stream of hydrogen admixed with inert gas, fail efficiently to prevent the local elevations of temperature. In spite of said precautions, it is not unfrequent to detect by means of thermometers having a small inertia, temperatures abruptly rising above 500° C., while thermometers positioned downstream with respect to the direction of hydrogen blow, i. e. nearer to the outlet of the tube, indicate no perturbation and remain at the predetermined temperature, for instance 140° C.

It is obvious that at so high temperatures, copper becomes strongly annealed without one suspects it unless abrupt rising of a thermometer positioned in the zone where reduction starts and whence it proceeds to next zones has been observed. Hence a momentous decrease of catalytic action occurs.

It is an object of my invention to produce copper catalysts and to provide a method of using the same, whereby any undesired rise of temperature during reduction of oxide is absolutely precluded, and catalysts having a remarkable potency and very long life are obtained, said catalysts being suitable to be substituted with advantage for nickel catalysts in a large number of hydrogenations.

According to this invention, I use heat evolved both during reduction and hydrogenation proper to evaporate water around tubes in which the catalyst is positioned, by adjusting pressure in the inter-tube space so as to hold water temperature at the desired value.

As the temperature at which either copper oxide reduction or hydrogenation of materials to be treated can be performed is rather low, it is easy for starting either reaction to bring water around the tubes to the desired temperature by simple heating for instance with live steam at a suitable pressure, which may vary according as the case may be from 1 kg to 10 kgs (absolute pressure) per square centimeter.

To sum up, in order to start reduction of copper oxide catalyst, suffice it to heat the whole apparatus by supplying it with live steam, while during the other operations (oxide reduction or hydrogenation of material) the apparatus will operate as a steam producer; the steam may be employed for any purpose.

Any suitable apparatus can be used for carrying out this invention into practice. By way of non-limitative illustration I have shown in the appended drawing an apparatus found to be suitable for carrying my process into practice and I shall now proceed with its description.

In a bundle of tubes A, $A_1$, $A_2$ etc., I place lozenges or tablets of catalysts made of copper oxide precipitated on an inert vehicle or carrier of any kind such as silica, kieselguhr, pumice, powdered or fibrous asbestos, with or without promoting agents. The tubes are held by two perforated plates B, $B_1$ in a casing C of any shape, the whole apparatus resembling a conventional evaporator, capable of resisting pressure.

Water is placed outwardly with respect to the tubes, nearly completely filling the inter-tube space.

The catalyst containing tubes are connected on the one hand with a condenser D and on the other hand with a tubular vaporizer E and a fan F. The fan is provided to force gases first into vaporizer E wherein liquid to be hydrogenated is further vaporized, thence through catalysis tubes A, $A_1$, $A_2$ etc. and finally into condenser D, after which is a vessel G for collecting condensed liquids.

Gases and non-condensed vapours are again taken up by fan F via pipe O and so on. A trap valve H is provided automatically to allow for introduction of hydrogen under predetermined pressure from gas tank I in proportion to its being used in catalysis oven (i. e. in the bundle of tubes A, A₁ etc.).

As previously explained, heat evolved during reduction of copper oxide or hydrogenation is effective to vaporize water around tubes A, A₁, etc. A balanced valve J adjusted to proper pressure depending upon the temperature which it is desired to maintain in the catalysis oven allows of the steam thus produced to escape, while distilled or merely purified water is supplied at required speed through pipe K by a pump A into inter-tube space to keep a constant water level therein.

The operation is as follows:

Tubes A, A₁, A₂ etc, are first charged with precipitated copper oxide or with copper oxide produced by calcination at a low temperature and the whole circuit is filled with nitrogen. Live steam at a pressure of 4 kgs. per sq. cm. is admitted past valve M controlling an apertured worm in the inter-tube space, bubbles through water in said space and heats it. A blow-off cock (not shown) is provided to remove excess water from condensed steam.

As valve J, adjusted to maintain around tubes A, A₁, A₂ etc. an absolute pressure of 4 kgs. per sq. cm. corresponding to a temperature of 140° C., begins to operate, heating is cut off and fan F is started, thereby further uniformising temperature at all points in said tubes. By opening a small blow-off cock N positioned upstream with respect to fan F, a little nitrogen is expelled, being replaced by pure hydrogen from gas tank I owing to operation of trap valve H.

Reduction immediately takes place; it is the more rapid as the proportion of hydrogen admitted into the cycle is larger. Heat evolved by reduction is effective to vaporize water which is blown off as steam from valve J. The reaction temperature is thus maintained at a very constant value owing to cooling produced by vaporization of water under constant pressure, and also to the high blast from fan F.

As operation proceeds, the proportion of hydrogen admitted into the cycle is gradually increased by causing nitrogen to be expelled little by little through blow-off cock N. Hence rapid reduction of copper oxide is effected without any risk of rush. Metal is not subjected to any overheating so that its catalytic potency is exceptionally high.

For hydrogenating an organic compound, it is vaporized by indirect heating in vaporizer E (which is of any type) through which a hydrogen stream is passed. The vapours are carried along with a large excess of hydrogen onto the catalyst so that hydrogenation can be complete, the liquid collected at G being the required hydrogenated product directly obtained in pure condition. Non-reacted hydrogen and vapours egressing out of catalysis tubes A, A₁, A₂ etc, pass into condenser D; condensed liquid is collected in vessel G and hydrogen saturated with vapours is again taken up by fan F and so on.

As previously explained, reaction temperature in the oven is adjusted in accordance with the pressure maintained in casing C by operating release valve J.

After any stopping of the apparatus, suffice it to heat for some time with live steam to start reaction again. Upon reaction being initiated, evolved heat is sufficient automatically to maintain temperature at proper value as previously explained, with production of vapour which for instance is forwarded to a container for any desired use.

It is still within the ambit of my invention to employ copper catalysts to which are admixed promoting agents or inert or semi-active substances, or else to bring about alterations in the apparatus above described.

In those cases in which hydrogenation should be performed at a temperature lower than 100° C., it is only necessary to maintain a suitable sub-atmospheric pressure in the inter-tube space.

Catalysts produced and used in accordance with my invention are characterized by an extraordinary activity or potency and a very long life which may be a plurality of thousand hours.

As specific examples of organic compounds capable of being hydrogenated by means of copper catalysts in accordance with this invention, I may mention saturated and unsaturated aliphatic aldehydes and ketones and, generally speaking, all compounds having an ethylenic group, saturated and unsaturated aromatic aldehydes, furfurol and derivatives thereof, alcohols liable to be converted into hydrocarbons, nitriles and so on, it being understood that the foregoing list should not be construed in a limitative sense.

The following examples given solely for the sake of illustration will show the large potency of copper catalysts produced in accordance with this invention.

*Example 1.—Hydrogenating acetone into isopropanol*

In an apparatus as above described and shown, comprising 40 tubes having a length of 2,500 mm. and a diameter of 76 mm., 350 litres of lozenges or tablets of a catalyst constituted by copper oxide precipitated on pumice were placed. After starting by injecting live steam as above described, reduction was performed at a temperature of 135° C. by maintaining a pressure of about 4 kg. per sq. cm. in the inter-tube space. Upon reduction being completed, the oven was supplied with 120 litres of acetone per hour, an excess of hydrogen corresponding to 20 times the theoretical amount being admitted into said oven by proper adjustment of valved by-pass P bringing the input and output sides of fan F. Temperature was maintained at 150° C.

Under the aforesaid conditions, acetone was integrally converted and isopropanol was directly obtained from vessel G located after the condenser.

If supply speed was doubled, i. e. brought to 240 litres per hour, the distillate contained 87 per cent of isopropanol. Non-converted acetone could be separated therefrom by simple distillation.

*Example 2.—Hydrogenating crotonaldehyde into butanol*

I used a catalyst constituted by copper oxide on kieselguhr. Reduction was carried out at 135° C. as in Example 1 and the oven was supplied with 90 litres of crotonaldehyde per hour, the catalyst being maintained at 160° C. Conversion into butanol was practically integral and the condensate contained but 5 to 20 grams of butyraldehyde per litre.

*Example 3.—Hydrogenating α - ethyl - β - propyl-acroleine*

I used the same apparatus as for Examples 1 and 2, and a copper oxide catalyst activated by 1 per thousand of cerium oxide. Reduction being effected at 135° C., the oven was then supplied with 75 litres of α-ethyl-β-propyl-acroleine per hour, the catalyst being maintained at 160° C. Conversion into ethyl-hexanol was quantitative.

*Example 4.—Hydrogenating furfurol*

Pure copper obtained by reducing oxide thereof at 140° C. was used as a catalyst. By effecting hydrogenation at a temperature of 170° C. in the same oven as in the foregoing examples, supplying it with 90 litres of furfurol per hour, conversion was complete and no further furfurol was found in the condensate; the latter consisted of 40 per cent of methylfurane and 60 per cent of furfuryl alcohol. At a lower temperature, for instance 140° C., no methylfurane was produced and furfuryl alcohol alone was obtained.

Finally, when furfuryl alcohol instead of furfurol was passed on the catalyst, its thorough conversion into methylfurane was performed at 170° C.

In all those reactions, no substantial production of resins or by-products was observed owing to the fact that the large amount of heat evolved by said hydrogenation reactions, more particularly during formation of methyl-furane was rapidly carried away.

*Example 5.—Hydrogenating acetaldehyde*

This hydrogenation could be effected at 65° C. Consequently, after effecting reduction of copper oxide at 135–140° C. as above explained, the intertube space was maintained under a sub-atmospheric pressure corresponding to a boiling point of 65° C. i. e. 187 mm. of mercury. Then, conversion of acetaldehyde into ethanol was practically complete.

What I claim is:

1. In a process for catalytically hydrogenating an organic substance which comprises passing hydrogen through an elongated reaction zone containing a charge of copper oxide and disposed in indirect heat exchange relationship with a heat exchange liquid, for the purpose of reducing copper oxide to copper, and thereafter passing vapours of a hydrogenatable organic substance in admixture with hydrogen through the freshly reduced copper in said elongated zone: the steps of first establishing a flow of an inert gas through said zone, heating said heat exchange liquid to copper oxide reduction temperature while simultaneously maintaining it under such a pressure as to cause said liquid to boil at said temperature, then cutting off heating while maintaining said pressure, and gradually and slowly substituting hydrogen for said inert gas to start and maintain the copper oxide reduction rapidly but evenly and without local overheating until the reduction to copper is completed, then employing the freshly reduced copper in the catalytic hydrogenation of an organic substance by admixing vapours of said hydrogenatable organic substance with said hydrogen at a point upstream with respect to said elongated reaction zone, and continuing the flow of the mixture of gases while simultaneously bringing said heat exchange liquid under such a pressure as to cause said liquid to boil at hydrogenation temperature for said organic substance.

2. The process of claim 1, the inert gas being nitrogen and the heat exchange liquid being water.

HENRI MARTIN GUINOT.

REFERENCES CITED

The following references are of record in the file of this patent:

UNITED STATES PATENTS

| Number | Name | Date |
|---|---|---|
| 949,003 | Ramage | Feb. 15, 1910 |
| 1,402,336 | Backhaus | Jan. 3, 1922 |
| 2,139,351 | Bejararno | Dec. 6, 1938 |
| 2,201,235 | Lenth et al. | May 21, 1940 |
| 2,224,049 | Herbert | Dec. 3, 1940 |
| 2,329,934 | Nord | Sept. 21, 1943 |

FOREIGN PATENTS

| Number | Country | Date |
|---|---|---|
| 639,756 | France | June 29, 1928 |